(12) United States Patent
Daoud

(10) Patent No.: US 6,356,695 B1
(45) Date of Patent: Mar. 12, 2002

(54) VARIABLE DEPTH/STACKABLE OPTICAL FIBER SEPARATOR

(75) Inventor: Bassel Hage Daoud, Morris County, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/364,261

(22) Filed: Jul. 30, 1999

(51) Int. Cl.⁷ .................................................. G02B 6/00
(52) U.S. Cl. ...................................................... 385/134
(58) Field of Search ................................. 385/134, 135

(56) References Cited

U.S. PATENT DOCUMENTS 5,884,001 A * 3/1999 Cloud et al. ................ 385/135
6,201,921 B1 * 3/2001 Quesnel et al. ............. 385/135

* cited by examiner

Primary Examiner—Frank G. Font
Assistant Examiner—Michael P. Mooney

(57) ABSTRACT

A variable depth stackable separator for separating cable into predetermined distinct groups includes a hub having a bottom member with a first surface and a second surface with an upwardly projecting sidewall forming a central area defining a predetermined radius. A connector is provided that projects from the first surface of the bottom member of the hub. A receiver is provided that projects from the second surface of the bottom member. The connector of the hub is adapted to be inserted into a receiver of a second hub to form a variable depth stackable separator for separating cable into predetermined distinct groups. Tabs are provided that project from the sidewall of the hub for retaining a cable relative to the hub. The variable depth stackable separator is designed for optical fiber cable to maintain a minimum bend radius for the optical fiber cable.

18 Claims, 2 Drawing Sheets

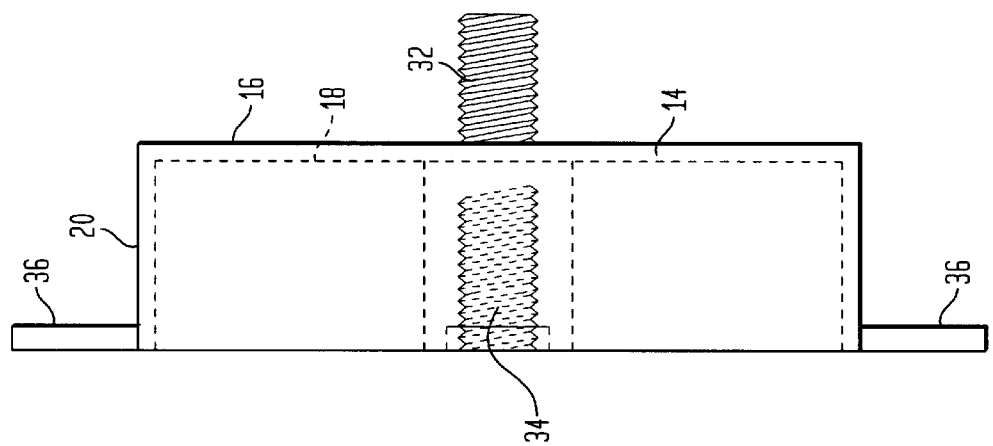
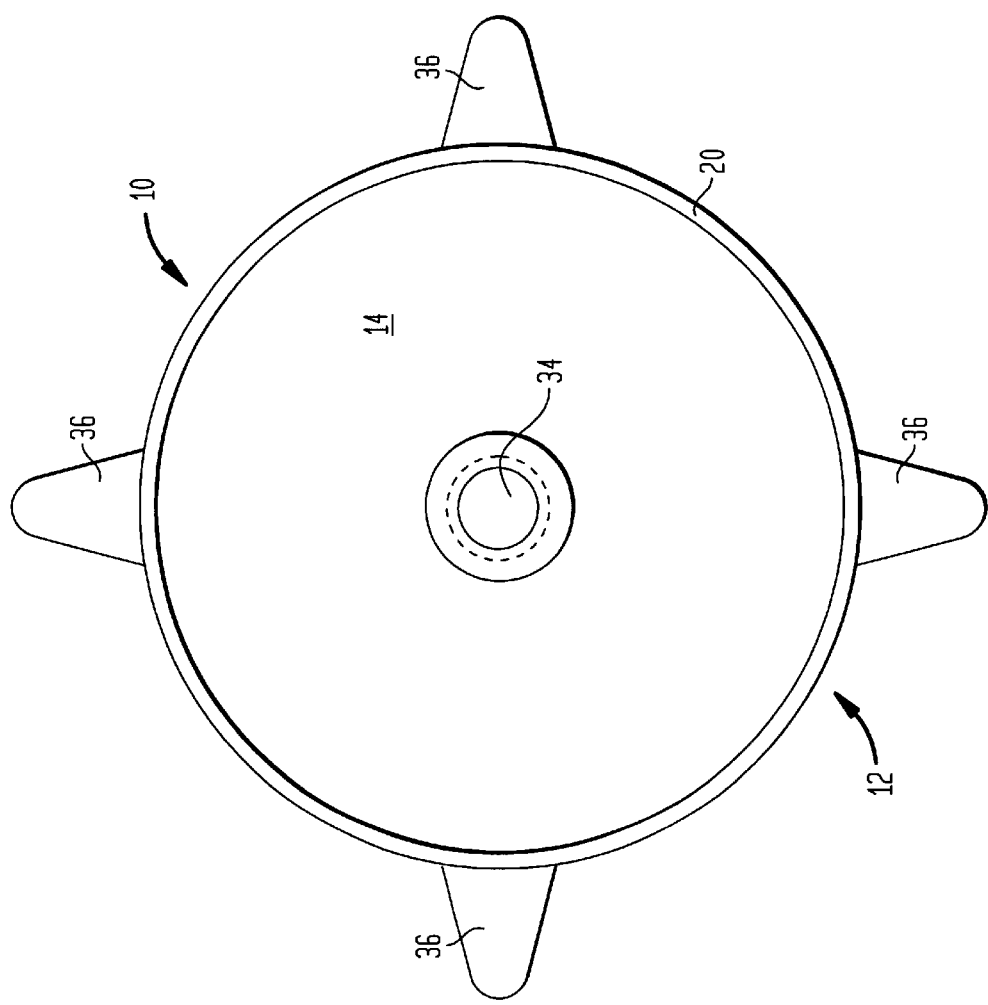

VARIABLE DEPTH/STACKABLE OPTICAL FIBER SEPARATOR

BACKGROUND OF THE INVENTION

1. Field of the Invention

A variable depth stackable separator is provided for separating cable into predetermined distinct groups includes a hub having a bottom member with a first surface and a second surface and an upwardly projecting sidewall forming a central area defining a predetermined radius for maintaining a minimum bend radius for the cable.

2. Description of Background Art

A junction box is normally provided for permitting cables to be connected relative to each other. A conventional junction box is designed to receive the cables and provides adequate space for splicing cables or connecting cables to switches or other devices.

In connecting optical fiber cables, a junction box is provided for permitting the optical fibers to be spliced together and to be connected to switches or other devices. However, it is desirable to provide a sufficient amount of slack for the optical fiber cables as they enter and exit from the junction box. In addition, to ensure the proper operation of the optical fiber cables, it is necessary to provide a minimum bend radius for the optical fiber cables. Conventional electrical junction boxes do not provide adequate accommodations for handling optical fiber cables.

SUMMARY AND OBJECTS OF THE INVENTION

It is an object of the present invention to provide a variable depth stackable separator for separating cables into predetermined distinct groups.

Another object of the present invention is to provide a stackable separator for maintaining a minimum bend radius of a optical fiber cable that is mounted thereon.

A further object of the present invention is to provide a stackable separator that requires a small footprint for separating a plurality of distinct groups of optical fiber cable within a junction box.

These and other objects of the present invention are achieved by providing a variable depth stackable separator for separating cable into predetermined distinct groups that includes a hub having a bottom member with a first surface and a second surface with an upwardly projecting sidewall forming a central area defining a predetermined radius. A connector is formed on the first surface of the bottom member of the hub. A receiver is formed on the second surface of the bottom member. The connector of the hub is adapted to be secured relative to a receiver of a second hub to form a variable depth stackable separator for separating cable into predetermined distinct groups. Tabs are provided that project from the sidewall of said hub for retaining a cable relative to said hub. The variable depth stackable separator is designed to provide a small footprint for the separator that maintains a minimum bend radius for the optical fiber cable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a top plan view of a variable depth stackable separator according to the present invention;

FIG. 2 is a partial cross-sectional view of the variable depth stackable separator as illustrated in FIG. 1.

DETAILED DESCRIPTION OF THE PREFERRED EMBODIMENTS

Figure 3:
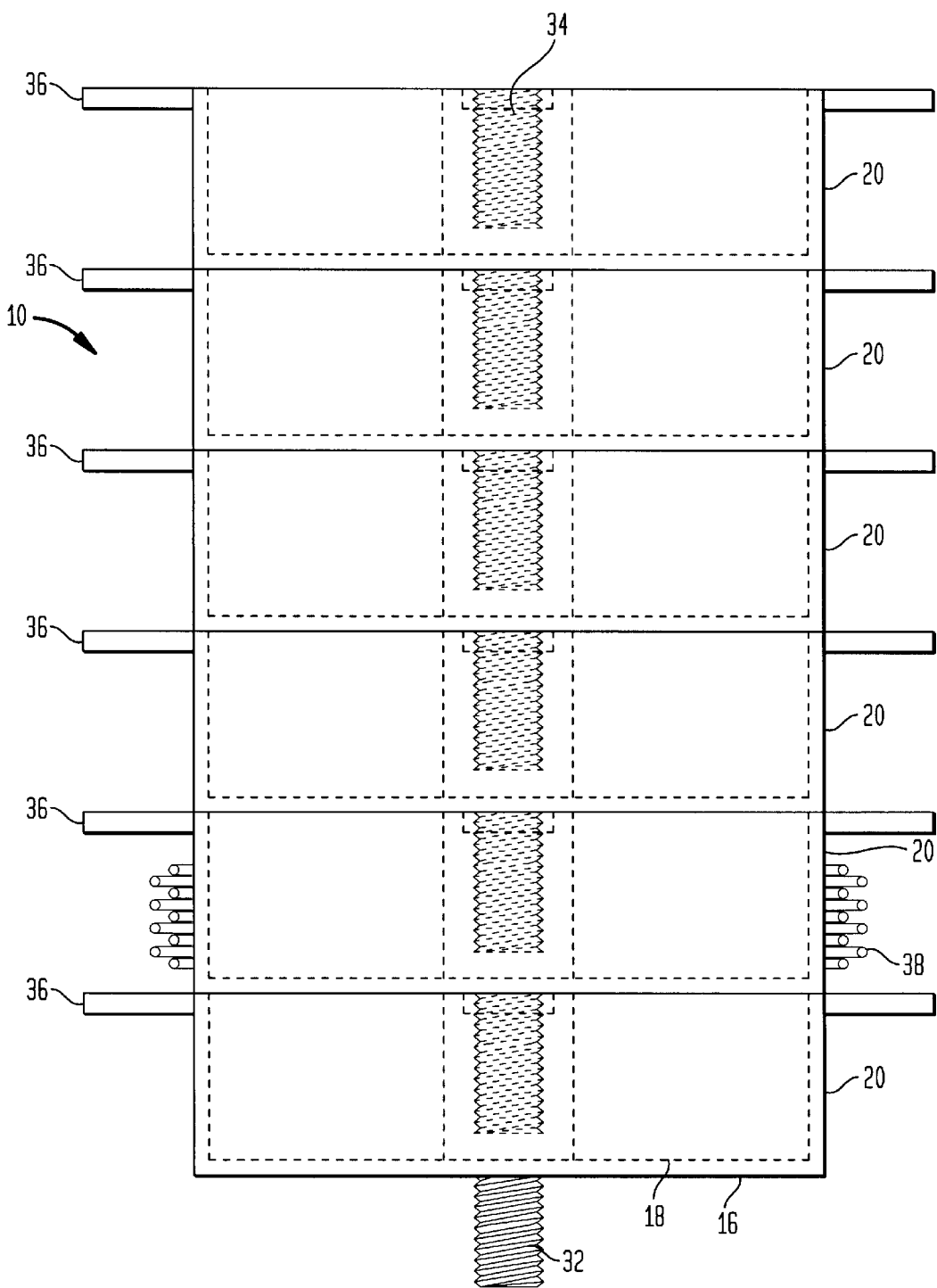
FIG. 3 is side elevational view taken partially in cross section to illustrate the connection between a plurality of variable depth stackable separators as illustrated in FIG. 1.

As illustrated in FIGS. 1–3, a variable depth stackable separator 10 is provided for separating cable 38 into predetermined distinct groups. The variable depth stackable separator 10 includes a hub 12 having a bottom member 14 with a first surface 16 and a second surface 18. An upwardly projecting sidewall 20 forms a central area defining a predetermined radius. A connector 32 is formed on the first surface 16 of the bottom member 14 of the hub 12. A receiver 34 is formed on the second surface 18 of the bottom member 14. The connector 32 of the hub 12 is adapted to be secured relative to a receiver 34 of a second hub to form a variable depth stackable separator 10 for separating cable 38 into predetermined distinct groups.

Tabs 36 are provided that project from the sidewall 20 of said hub 12 for retaining a cable relative to said hub 12. The variable depth stackable separator 10 is designed to provide a small footprint for the separator as the separator is secured within a junction box. In addition, the sidewall 20 maintains a minimum bend radius for the optical fiber cable so that light is transmitted therethrough without interruption. If a kink is formed in the optical fiber cable, the transmission of light may be interrupted to interfere with the operation of the optical fiber cable 38.

The connector 32 and the receiver 34 are illustrated as being screw threaded. It is to be understood that the mounting of the connector 32 and the receiver 34 may be reversed to change the orientation of the manner in which the variable depth stackable separators 10 are secured relative to each other. In addition, a latch may be mounted on the variable depth stackable separators 10 to permit a plurality of variable depth stackable separators 10 to be secured relative to each other. Any means for securing the variable depth stackable separators 10 relative to an adjacent variable depth stackable separators 10 are contemplated as being included within the scope of the present invention.

It is to be understood that a plurality of variable depth stackable separators 10 may be connected one to another to form a stack for separating a plurality of cables 38 into predetermined distinct groups. The depth of the enclosure of the junction box is the only limitation on the height of the plurality of variable depth stackable separators 10 that may be connected relative to each other.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A variable depth stackable separator for separating cable into predetermined distinct groups comprising:
- a hub including a bottom member having a first surface, a second surface and a sidewall forming a central area on said second surface of said bottom member and being adapted to retain a cable wound outside of an outer periphery of said sidewall of said hub;
- a connector formed on said first surface of said bottom member of said hub; and
- a receiver formed on said second surface of said bottom member;
- wherein securing said connector of said hub relative to a receiver of a second hub forms a variable depth stackable separator adapted to separate cable into predetermined distinct groups.

2. The variable depth stackable separator for separating cable into predetermined distinct groups according to claim 1, and further including tabs projecting outwardly from said outer periphery of said sidewall of said hub for retaining a cable relative to said hub.

3. The variable depth stackable separator for separating cable into predetermined distinct groups according to claim 1, wherein said cable is optical fiber cable.

4. The variable depth stackable separator for separating cable into predetermined distinct groups according to claim 3, wherein said outer periphery of said sidewall of said hub has a predetermined radius which is a minimum bend radius for said optical fiber cable.

5. The variable depth stackable separator for separating cable into predetermined distinct groups according to claim 1, wherein a plurality of hubs are securable one adjacent to another for forming said stackable separator.

6. The variable depth stackable separator for separating cable into predetermined distinct groups according to claim 1, wherein said connector formed on said first surface of said bottom member of said hub is screw threaded.

7. The variable depth stackable separator for separating cable into predetermined distinct groups according to claim 6, wherein said receiver formed on said second surface of said bottom member is screw threaded.

8. The variable depth stackable separator for separating cable into predetermined distinct groups according to claim 1, wherein said variable depth stackable separator separates a plurality of distinct cables from each other during storage.

9. The variable depth stackable separator for separating cable into predetermined distinct groups according to claim 1, wherein said sidewall of said hub forms a complete circle when viewed in cross section.

10. A variable depth stackable separator for separating cable into predetermined distinct groups comprising:
- a hub including a bottom member having a first surface and a second surface with an upwardly projecting sidewall forming a central area defining a predetermined area adapted for retaining a cable wound outside of an outer periphery of said sidewall of said hub;
- a connector projecting from said first surface of said bottom member of said hub; and
- a receiver projecting from said second surface of said bottom member;
- wherein inserting said connector of said hub into a receiver of a second hub forms a variable depth stackable separator adapted to separate cable into predetermined distinct groups.

11. The variable depth stackable separator for separating cable into predetermined distinct groups according to claim 10, and further including tabs projecting outwardly from said outer periphery of said sidewall of said hub for retaining a cable relative to said hub.

12. The variable depth stackable separator for separating cable into predetermined distinct groups according to claim 10, wherein said cable is optical fiber cable.

13. The variable depth stackable separator for separating cable into predetermined distinct groups according to claim 12, wherein said outer periphery of said sidewall of said hub has a predetermined radius which is a minimum bend radius for said optical fiber cable.

14. The variable depth stackable separator for separating cable into predetermined distinct groups according to claim 10, wherein a plurality of hubs are connectable one adjacent to another for forming said stackable separator.

15. The variable depth stackable separator for separating cable into predetermined distinct groups according to claim 10, wherein said projection from said first surface of said bottom member of said hub is screw threaded.

16. The variable depth stackable separator for separating cable into predetermined distinct groups according to claim 15, wherein said receiver projecting from said second surface of said bottom member is screw threaded.

17. The variable depth stackable separator for separating cable into predetermined distinct groups according to claim 10, wherein said variable depth stackable separator separates distinct cables from each other during storage.

18. The variable depth stackable separator for separating cable into predetermined distinct groups according to claim 10, wherein said upwardly projecting sidewall of said hub forms a complete circle when viewed in cross section.

* * * * *